(12) United States Patent
Kochan, Jr.

(10) Patent No.: US 7,612,529 B2
(45) Date of Patent: Nov. 3, 2009

(54) PUMP CONTROL WITH MULTIPLE RECHARGEABLE BATTERY DOCKING STATIONS

(75) Inventor: John R. Kochan, Jr., Naperville, IL (US)

(73) Assignee: Metropolitan Industries, Inc., Romeoville, IL (US)

( * ) Notice: Subject to any disclaimer, the term of this patent is extended or adjusted under 35 U.S.C. 154(b) by 344 days.

(21) Appl. No.: 11/623,377

(22) Filed: Jan. 16, 2007

(65) Prior Publication Data

US 2007/0188129 A1    Aug. 16, 2007

Related U.S. Application Data

(60) Provisional application No. 60/760,550, filed on Jan. 20, 2006.

(51) Int. Cl.
*H01M 10/46* (2006.01)

(52) U.S. Cl. .................................................... 320/114
(58) Field of Classification Search ................. 320/103, 320/110, 114, 115, 116; 307/66
See application file for complete search history.

(56) References Cited

U.S. PATENT DOCUMENTS

| 6,545,445 B1 * | 4/2003 | McDermott et al. ......... 320/103 |
| 2003/0090233 A1 * | 5/2003 | Browe ........................ 320/101 |
| 2005/0024015 A1 * | 2/2005 | Houldsworth et al. ....... 320/119 |

* cited by examiner

*Primary Examiner*—Edward Tso
(74) *Attorney, Agent, or Firm*—Husch Blackwell Sanders Welsh & Katz

(57) ABSTRACT

A backup pump control unit can incorporate ports to receive rechargeable batteries such as lithium ion, nickel cadmium or nickel metal hydride batteries. Multiple units can be coupled together to increase the available, stored electrical energy. In the absence of AC-type input power, the batteries can energize a backup pump.

26 Claims, 3 Drawing Sheets

1

PUMP CONTROL WITH MULTIPLE RECHARGEABLE BATTERY DOCKING STATIONS

CROSS-REFERENCE TO RELATED APPLICATION

This application claims the benefit of the filing date of U.S. Provisional Application Ser. No. 60/760,550 filed Jan. 20, 2006, and entitled "Pump Control With Multiple Rechargeable Battery Docking Stations" which is incorporated herein by reference.

FIELD

The invention pertains to battery powered sump pumps. More particularly, the invention pertains to battery rechargers usable to energize such pumps in the absence of utility supplied AC-type energy.

BACKGROUND

A variety of backup systems for sump pumps have developed over a period of time. Such systems find applicability in installations where it is desirable to be able to continue pumping, as needed, even in the absence of utility-supplied AC-type electrical energy. Some of these systems include rechargeable wet cells, for example, marine batteries of various capacities. Others of them can be configured with backup generators which are started to provide electrical energy in the absence of utility-supplied AC.

Rechargeable battery technologies are evolving so as to provide high energy density, sealed, rechargeable batteries which might be used for example with power tools and the like. Such batteries based on lithium ion, nickel cadmium or nickel metal hydride technologies provide high efficiency rechargeable power sources for a variety of portable tools and the like.

It would be desirable to be able to take advantage of evolving battery technologies in providing energy sources for backup sump pumps for example. Further, it would be desirable to be able to readily accommodate a variety of battery technologies, form factors or shapes, as well as output voltages in a way which would make coupling the batteries to the respective pump quick and convenient. Thus, there continues to be a need for devices which can interface various types of batteries and battery technologies to backup sump pumps.

DETAILED DESCRIPTION

Figure 1A:
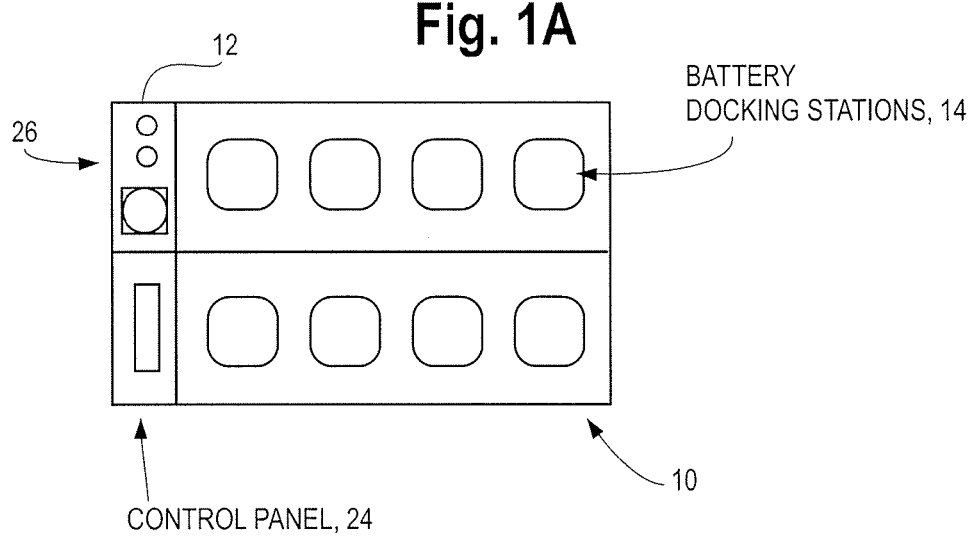
FIG. 1A is a top plan view of an apparatus which embodies the invention.

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

A backup pump control unit in accordance with the invention can incorporate a plurality of docking stations for different rechargeable batteries having different physical configurations, as well as different electrical characteristics. Representative batteries include those which are used to energize power tools such as lithium ion, nickel cadmium or nickel metal hydride batteries.

The batteries can be plugged into a multi-station recharging unit which also incorporates control circuitry coupled to a pump control switch, for example, a float. In one embodiment of the invention, the unit can respond to a loss of utility supplied AC power to then energize the backup pump, which could be a DC pump, utilizing the plurality of batteries plugged into the various docking stations. In the presence of utility supplied AC power the unit could include an appropriate rectification circuit for purposes of providing DC-type electrical energy to run the pump as needed and to continually recharge the batteries.

Yet another embodiment of the invention would include a pump and control unit with multiple rechargeable batteries. This unit would have 115V input and a DC output and several alarm options. One of the advantages of this unit is that a user can use from one to a large number of batteries that would constantly be kept charged in one or more coupled docking station(s).

Figure 1B:
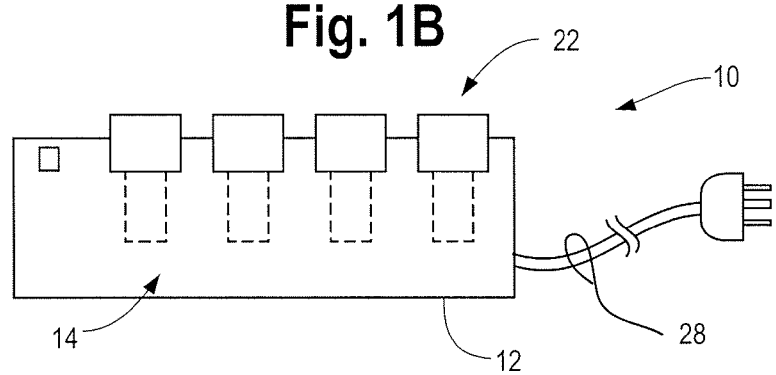
FIG. 1B is a side elevational view of the battery docking/recharging station of FIG. 1A.

FIGS. 1A and 1B illustrate respectively top plan views and side elevational views of a battery docking/recharging unit 10. Unit 10 includes a housing 12 in which is formed a plurality of battery docking stations 14.

Figure 1C:
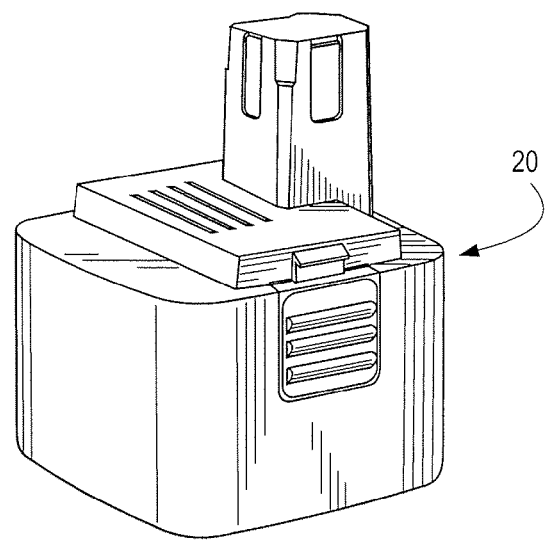
FIG. 1C is an isometric view of a representative nickel metal hydride battery usable with the station of FIGS. 1A, 1B.

It will be understood by those of skill in the art that the battery docking stations 14 would have a configuration compatible with and for the purpose of releasibly receiving a selected rechargeable battery. Neither the particular type of battery or batteries nor the technology are limitations of the present invention. FIG. 1C illustrates a commercially available, known 12 volt nickel metal hydride battery of a type which might be used with the unit 10. The docking stations 14 would have a shape compatible with the form factor of the battery 20 and would also provide electrical contacts for engaging the contacts of the selected battery.

FIG. 1B illustrates representative members of a plurality 22 of batteries of the type 20. The members of plurality 22 are illustrated in FIG. 1B inserted into respective members of the plurality of docking stations 14. It will be understood that while the docking stations 14 illustrated in FIGS. 1A and 1B are substantially identical, the exact shape thereof is not a limitation of the present invention. Different shapes of docking stations, compatible with different battery form factors could be formed in the housing 12 without departing from the spirit and scope of the present invention. Similarly, the output voltage of the batteries intended to be recharged by the unit 10 do not represent a limitation of the present invention.

In the exemplary embodiment of FIGS. 1A, 1B the unit 10 includes a control panel 24 which could include a plurality of status indicating visual indicators 26, on/off switches and the like including one or more alarm indicators if desired all without limitation.

Those of skill in the art will understand that the members of plurality 22 could be configured so as to be coupled together in series and/or in parallel or both in accordance with a particular embodiment of the invention all without limitation. In one embodiment of the invention, the unit 10 can couple the members of plurality 22 in parallel so as to increase available stored energy at a predetermined voltage such as 12, 24 or 36 volts for example. Alternately, some members of the plurality 22 can be coupled in series to increase the voltage thereof. Those series coupled members can in turn be coupled in parallel with other sets of series coupled members from the plurality 22 so as to increase available power at the higher output voltage level.

The unit 10 can be used for purposes of providing electrical energy to either a primary or backup DC pump motor. Other loads can be driven all without limitation.

The unit 10, for example can receive AC-type electrical energy via connector 28 from a displaced source, such as an electric utility and couple that form of electrical energy directly to a primary pump, if desired, and/or couple DC-type electrical energy from members of the plurality 22 to a DC-type pump motor either functioning as a primary pump or a backup pump which is activated in the absence of electrical energy being received via the connector 28.

Figure 2:
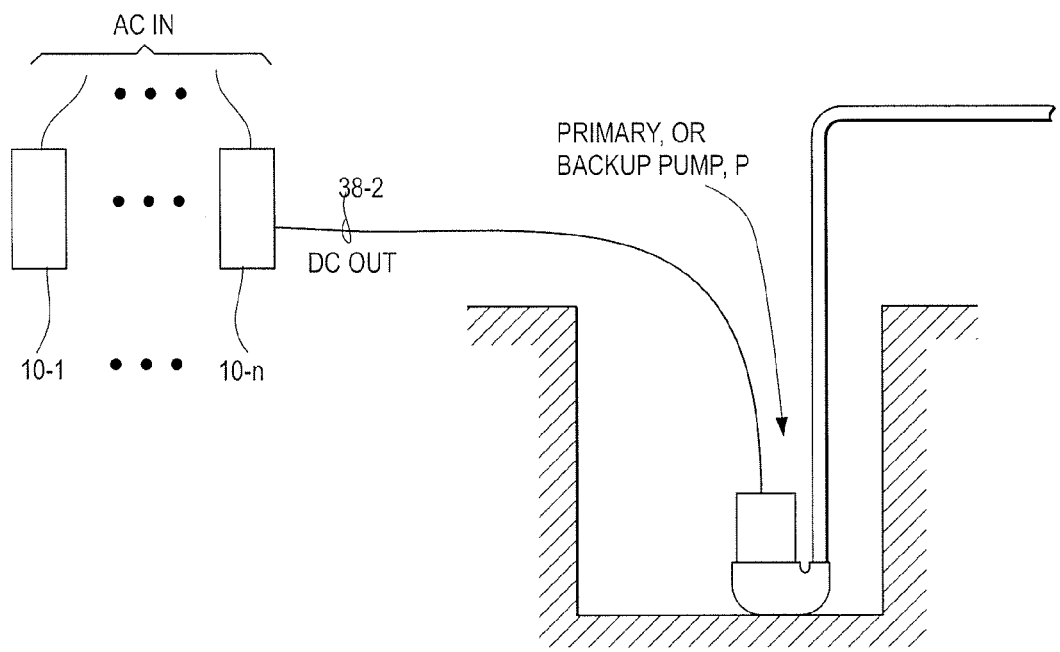
FIG. 2 is a block diagram illustrative of a plurality of units as in FIG. 1A being used to activate a selected load.

FIG. 2 illustrates a plurality of coupled units 10-1 ... 10-n each of which would incorporate a plurality of batteries, such as the plurality 22 previously discussed. Electrical energy from the units 10-1 ... 10-n could in turn be used to drive a primary or backup pump P having a DC-type motor, via connector 38-2.

Figure 3:
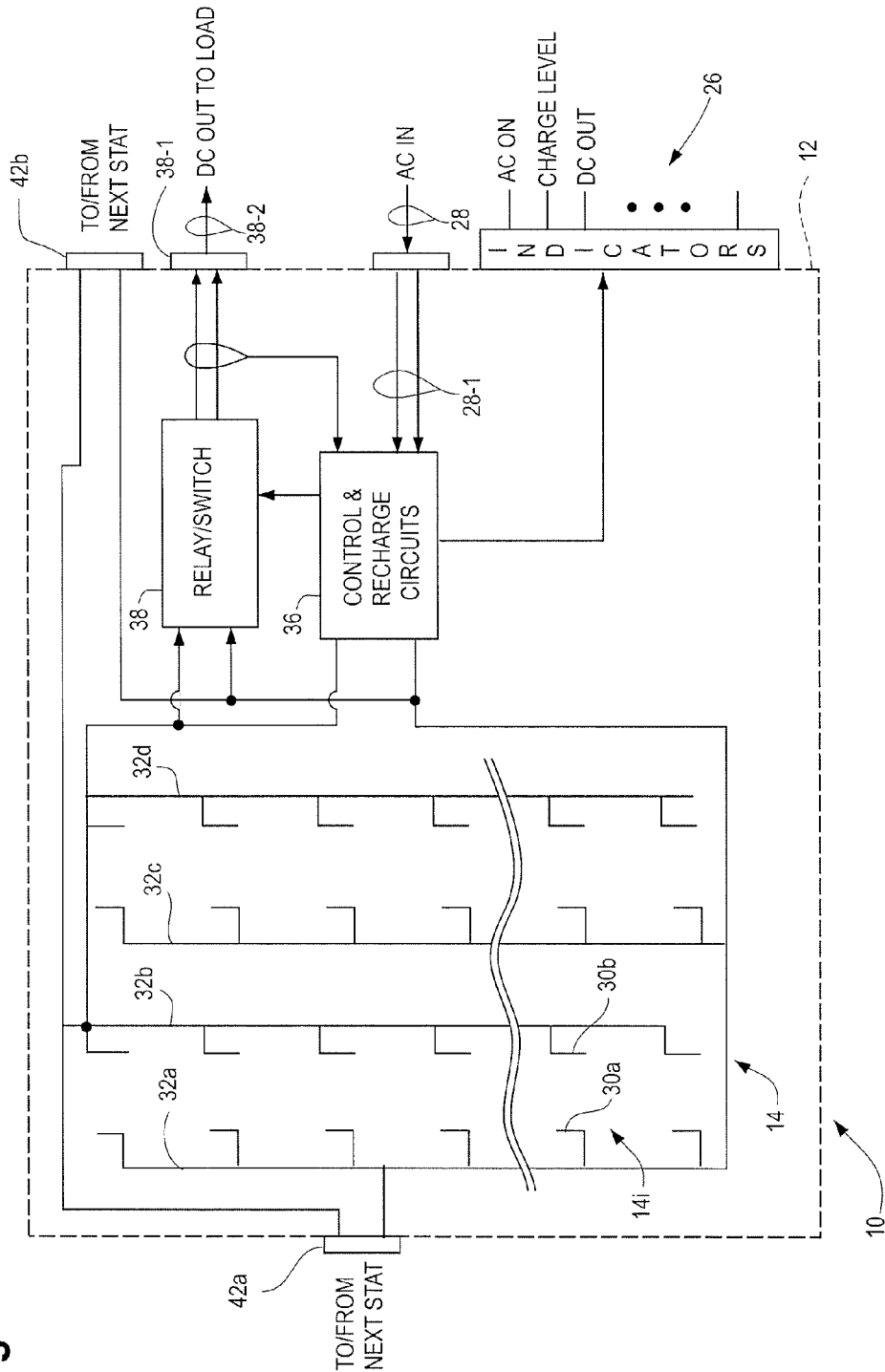
FIG. 3 is a block diagram schematic of the electrical aspects of the unit of FIGS. 1A, 1B.

FIG. 3 illustrates an exemplary unit 10 in greater detail. In FIG. 3, the unit 10 includes the plurality of battery docking stations previously discussed, indicated generally at 14 formed in housing 12. The members of the plurality 14, such as the member 14i include first and second electrical conductors 30a, b which releasibly engage the contacts of a respective member of the plurality 22. In the embodiment of the unit 10 illustrated in FIG. 3 the pairs of conductors, such as 30a, 30b of each of the docking stations such as 14i are all coupled in parallel via conductors 32a, b, c and d to control and rectification circuits 36 as well as relay/switch circuit 38.

Control and rectification circuits 36 receive AC-type electrical energy via connector 28 and conductors 28-1 for purposes of providing rectified electrical energy to the conductors 32a ... d for recharging the members of the plurality 22. Circuitry 36 could also monitor the status of the AC input signals and in the absence thereof respond by enabling relay/switch circuitry 38 to change state so as to switch electrical energy stored in batteries 22 to DC output connector 38-1. The connector 38-1 can be coupled via conductors or cables 38-2 to a selected load such as a primary or backup pump P.

Those of skill in the art will understand that other configurations are available for the unit 10 than the exemplary configuration described above. For example, the pump P can be driven with electrical energy from the members of the plurality 22 irrespective of the presence of AC input energy. In this configuration, the loss of electrical energy on the input connector 28 could be sensed by the control and rectification circuits 36 for purposes of activating alarms or visual output indicators 26. The pump P would continue to be energized by the members of the plurality of batteries 22 in the absence of input AC-type electrical energy. When the supply of AC-type input electrical energy was restored to the connector 28, the control and rectification circuits 36 would recharge the members of the plurality 22 as needed. In this configuration, relay/switch 38 could be eliminated.

Also as indicated in FIG. 3, the unit 10 carries on housing 12 first and second connectors 42a, 42b for purposes of coupling to other similar units such as 10-1 ... 10-n as illustrated in FIG. 2 to increase the amount of stored energy for activating the pump P.

Thus, as those of skill will understand, the electrical docking/recharging units, such as the units 10, 10-1 ... n can be coupled in series or parallel so as to either increase the available output voltage or increase available stored electrical energy to be delivered to an associated load, such as the pump motor for the pump P all without limitation. Further, the members of the plurality 22 need not be substantially identical and could be implemented with various form factors and output voltages all without departing from the spirit and scope of the present invention.

It will be understood that several units could be plugged together to provide various output DC voltages as well as to increase available stored energy to power the pump. It will also be understood by those of skill in the art that none of the types of battery, or battery output voltages nor the electrical characteristics of the pump motor are limitations of the invention.

Those of skill in the art will also realize that in the absence of any batteries, or battery packs, coupled to unit 10 that the Control and Rectification Circuits, which carry out the battery charging function, could be capable of energizing the DC motor as required. In this regard, those circuits could implement a high current battery charger capable of multiple output voltages to charge a variety of different batteries as well as different models of battery packs.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A pump control system comprising:
   a battery recharging unit, the unit having a plurality of battery receiving ports, the ports are each configured to removably receive and recharge a predetermined rechargeable battery, where each port includes first and second battery engaging conductors with at least two of the first conductors in continuous electrical contact with one another, and with at least two of the second conductors in continuous electrical contact with one another;
   a pump connector; and
   circuitry coupled to the ports and the connector to couple electrical energy from one of, rechargeable batteries or a displaced electrical source, to the pump connector.

2. A system as in claim 1 which includes a plurality of rechargeable batteries which releasibly engage at least some of the ports.

3. A system as in claim 1 where the ports include at least a first configuration and a second configuration for first and second different battery shapes.

4. A system as in claim 1 where the unit includes an expansion port, and a second recharging unit releasibly coupled thereto.

5. A system as in claim 1 where the unit includes a housing which carries the ports, the connector and the circuitry.

6. A system as in claim 4 where the unit includes a housing which carries the ports, the connector, the circuitry and the expansion port.

7. A system as in claim 6 which includes at least a third recharging unit coupled to at least one of the other units.

8. A system as in claim 1 which includes a power input port for receipt of electrical energy from a displaced electric source.

9. A system as in claim 1 which includes rectifying circuitry, coupled to the ports for coupling electrical energy from a displaced electrical source to the ports to recharge batteries coupled thereto.

10. A system as in claim 9 where the recharging unit includes at least one battery status indicator.

11. A system as in claim 9 where the unit includes at least one alarm indicator.

12. An apparatus comprising:
a plurality of separable battery recharging units, the units are electrically coupled together and each carries a plurality of battery recharging ports, at least one of the units carries a pump connector port, at least one of the units carries an AC-type input port to couple electrical energy from a displaced source to at least some of the recharging ports.

13. An apparatus as in claim 12 where the units are substantially identical.

14. An apparatus as in claim 13 where the units each include battery recharging circuitry.

15. An apparatus as in claim 14 which includes a pump coupled to the pump connector.

16. An apparatus as in claim 14 which includes pump control circuitry responsive to an absence of AC-type electrical energy at the AC-type input port.

17. An apparatus as in claim 16 where the circuitry, in the absence of AC-type electrical energy, couples battery originated electrical energy to the pump connector.

18. An apparatus as in claim 17 which includes at least one of a plurality of lithium ion, nickel cadmium or nickel metal hydride-type batteries coupled to respective recharging ports.

19. A pump control unit comprising:
a housing;
first and second pluralities of battery contacts carried by the housing where all contacts of a respective plurality are in continuous electrical contact with each other;
first and second electrical ports carried by the housing where the first and second pluralities of contacts are continuously electrically connected to the ports; and
a pump connector port switchably coupled to the first and second pluralities of contacts.

20. A pump control unit as in claim 19 which includes a switching element coupled to the first and second pluralities and the pump connector port.

21. A pump control unit as in claim 20 which includes rectification circuits coupled to the first and second pluralities and the switching element.

22. A pump control unit as in claim 21 which includes first and second input/output connectors, carried by the housing, connected electronically in parallel with the first and second pluralities of battery contacts.

23. A pump control unit as in claim 19 which includes first and second input/output connectors, carried by the housing, connected electronically in parallel with the first and second pluralities of battery contacts.

24. An apparatus comprising:
a plurality of separate battery recharging units, each unit includes a housing having a plurality of battery recharging ports and two spaced apart connectors, at least one of the units carries a pump connector port, at least one of the units carries an AC-type input port to couple electrical energy from a displaced source to at least some of the recharging ports where the members of the plurality can be plugged together to provide one of increased output voltage at the pump connector port, or, increased available stored energy at the pump connector port.

25. An apparatus as in claim 24 where the units are substantially identical.

26. An apparatus as in claim 24 which includes pump control circuitry responsive to an absence of AC-type electrical energy at the AC-type input port.

* * * * *